UNITED STATES PATENT OFFICE.

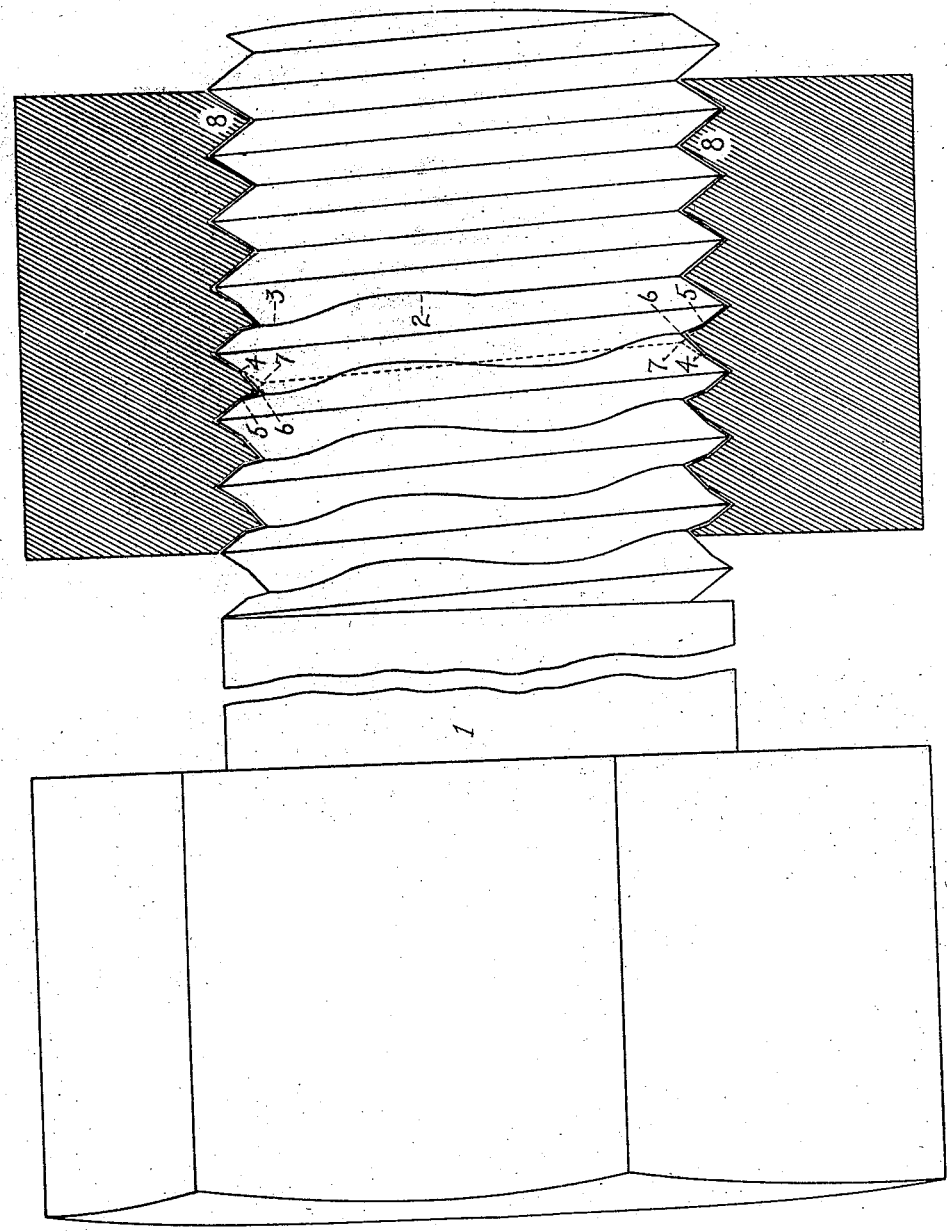

FRANK P. HAINES, OF ZANESVILLE, OHIO.

SELF-LOCKING SCREW.

1,070,247.   Specification of Letters Patent.   Patented Aug. 12, 1913.

Application filed July 9, 1910. Serial No. 571,252.

*To all whom it may concern:*

Be it known that I, FRANK P. HAINES, a citizen of the United States, residing at Zanesville, in the county of Muskingum and State of Ohio, have invented a new and useful Self-Locking Screw, of which the following is a specification.

My invention is an improvement in self-locking screws that are adapted to deflect, and interlock with, the threads of their companion screws; and the object of my invention is, to provide a screw with such a disposed form of helical groove as is adapted, without substantial impairment of the prime quality, the holding quality, of either its own thread or the thread of its companion screw, to deflect, and interlock itself with, the normal or standard thread of its companion screw.

I attain this object by the mechanism illustrated in the accompanying drawing, in which—

The figure is a view of my invention in a male screw, with a section of a female screw engaged therewith.

1 is a male screw having a staggered, helical groove formed by providing projections 2 and 3, integrally formed with its thread, in and alternately on opposite sides of its projected, normal, helical groove; the face of each of said projections being, in form, coalesced, longitudinal and transverse inclines to their own side of said projected, normal, helical groove; each of said transverse inclines forming with its own side of said projected, normal, helical groove, an acute angle opening toward the bottom of said projected, normal, helical groove as shown in the figure where solid lines 4—6 join dotted lines 4—7; and that part (of the side of said staggered, helical groove) opposite each of said projections, corresponding in form with its said opposite projection, forming a corresponding cut or cavity in the projected, normal, helical thread, and thereby providing both, the way or groove for the thread 8 of a companion screw, and also a part of, or an approach to, the said alternate, deflecting and interlocking projection; and forming with its own side of said projected, normal, helical groove, an acute angle opening toward the bottom of said staggered, helical groove as shown in the figure where solid lines 5—6 join dotted lines 5—7. But, without departing from my invention, each said transverse incline can be so inclined, that it will form said acute angle with the plane of, but above, the side of its own projected, normal, helical groove.

I claim—

1. A screw having an inclined, staggered, helical groove provided with longitudinal inclines combined with transverse inclines, said combined inclines being adapted to deflect, and interlock with, the thread of a companion screw, substantially as described.

2. A screw having an inclined, staggered, helical groove provided with longitudinal inclines combined with transverse inclines forming acute angles opening toward the bottoms of both the projected, normal, helical groove and said inclined, staggered, helical groove, said combined inclines being adapted to deflect and interlock with the thread of a companion screw, substantially as described.

3. A screw having an inclined, staggered, helical groove provided with a normal, upper part and, below said normal, upper part, with longitudinal inclines combined with transverse inclines forming acute angles opening toward the bottoms of both, the projected, normal, helical groove and said inclined, staggered, helical groove, said combined inclines being adapted to deflect, and interlock with, the thread of a companion screw, substantially as described.

4. A screw having in, and alternately on opposite sides of, its projected, normal, helical groove, longitudinal inclines combined with transverse inclines forming acute angles opening toward the bottom of said projected, normal, helical groove, said combined inclines being adapted to deflect, and to divide the deflection of, and to interlock with, the thread of a companion screw, substantially as described.

5. A screw having an inclined, staggered, helical groove provided in, and alternately on opposite sides of, its projected, normal, helical groove, with longitudinal inclines combined with transverse inclines forming acute angles opening toward the bottoms of both said projected, normal, helical groove and said inclined, staggered, helical groove, said combined inclines being adapted to deflect, and to divide the deflection of, and to inter-lock with, the thread of a companion screw, substantially as described.

6. A screw having an inclined, staggered, helical groove provided with a normal, upper part and, below said normal, upper part and in and alternately on opposite sides of its projected, normal, helical groove, with longitudinal inclines combined with transverse inclines forming acute angles opening toward the bottoms of both, said projected, normal, helical groove and said inclined, staggered, helical groove, said combined inclines being adapted to deflect, and to divide the deflection of, and to inter-lock with, the thread of a companion screw, substantially as described.

FRANK P. HAINES.

Witnesses:
W. C. BLOCKSONE,
A. J. RILEY.

Copies of this patent may be obtained for five cents each, by addressing the "Commissioner of Patents Washington, D. C."